United States Patent
Ruuska

(10) Patent No.: US 6,513,825 B2
(45) Date of Patent: Feb. 4, 2003

(54) COUPLING ARRANGEMENT BETWEEN A TRAILER AND A PULLING VEHICLE

(75) Inventor: Mauno Ruuska, Vammala (FI)

(73) Assignee: Patria Vammas Oy, Vammala (FI)

( * ) Notice: Subject to any disclaimer, the term of this patent is extended or adjusted under 35 U.S.C. 154(b) by 0 days.

(21) Appl. No.: 09/799,515

(22) Filed: Mar. 7, 2001

(65) Prior Publication Data

US 2002/0125682 A1 Sep. 12, 2002

(51) Int. Cl.[7] .................................................. B62D 53/06
(52) U.S. Cl. ...................................... 280/426; 280/442
(58) Field of Search .............................. 280/442, 443, 280/444, 426

(56) References Cited

U.S. PATENT DOCUMENTS

| | | | | | |
|---|---|---|---|---|---|
| 2,750,208 A | * | 6/1956 | Henry | ........................ | 280/103 |
| 2,959,428 A | * | 11/1960 | Felburn | ........................ | 280/426 |
| 4,982,976 A | * | 1/1991 | Kramer | ........................ | 280/426 |
| 5,026,085 A | * | 6/1991 | Ducote | ........................ | 280/426 |
| 5,201,836 A | * | 4/1993 | DeWitt | ........................ | 280/426 |
| 5,536,030 A | * | 7/1996 | Bettini | ........................ | 280/426 |

* cited by examiner

Primary Examiner—Kevin Hurley
(74) Attorney, Agent, or Firm—Larson & Taylor PLC

(57) ABSTRACT

A coupling arrangement between a trailer and a pulling vehicle wherein the pulling vehicle includes a first coupling plate on which the corresponding second coupling plate of the trailer is placed for obtaining locked coupling. The plates have low friction surfaces allowing the second plate to rotate on the first plate. The plates are locked to each other by a vertical pin fixed to the second coupling plate. The first coupling plate includes an open groove for the pin to get into the locking position in the end of the groove. The coupling arrangement further includes a movable locking part fixed to the second plate and being able by means of a spring to move into the groove of the first coupling plate when the plates are rotating in relation to each other.

5 Claims, 4 Drawing Sheets

COUPLING ARRANGEMENT BETWEEN A TRAILER AND A PULLING VEHICLE

FIELD OF THE INVENTION

The invention relates to a coupling arrangement between a trailer and a pulling vehicle, wherein the invention will noticeable improve the coupling operation when the pulling vehicle is driven to connect to that kind of coupling which comprises a steering arrangement from the coupling to the trailer wheels. The vehicle can be driven into the coupling of the trailer from all possible directions when using the arrangement according to this invention.

BACKGROUND OF THE INVENTION

The earlier known trailer coupling, where turning of trailer wheels have been combined with the coupling, is carried out so that the pulling vehicle has to be driven into the coupling in a very accurate direction so that the locking part fixed to the trailer coupling will meet the groove of the coupling plate in the pulling vehicle. So, the driving of the pulling vehicle into the coupling has to be done just in the same direction as the pulling vehicle has been discoupled.

SUMMARY OF THE INVENTION

By means of the coupling arrangement according to this invention a great improvement is achieved.

A remarkable advantage is obtained when the pulling vehicle can be driven into coupling in all possible directions and the coupling can be locked, and additionally steering for trailer wheels also is transmitted from the coupling. If the driving direction differs from the previous discoupling direction, the movable locking part will move into the groove after a little curved drive of the pulling vehicle. When the locking part thus automatically has moved into the groove, the turning of the trailer wheels begins to operate properly as the turning of the trailer wheels is steered by the coupling arrangement.

BRIEF DESCRIPTION OF THE DRAWINGS

In the following, the invention is explained by referring the enclosed drawings, wherein.

DETAILED DESCRIPTION OF THE INVENTION

Figure 1:
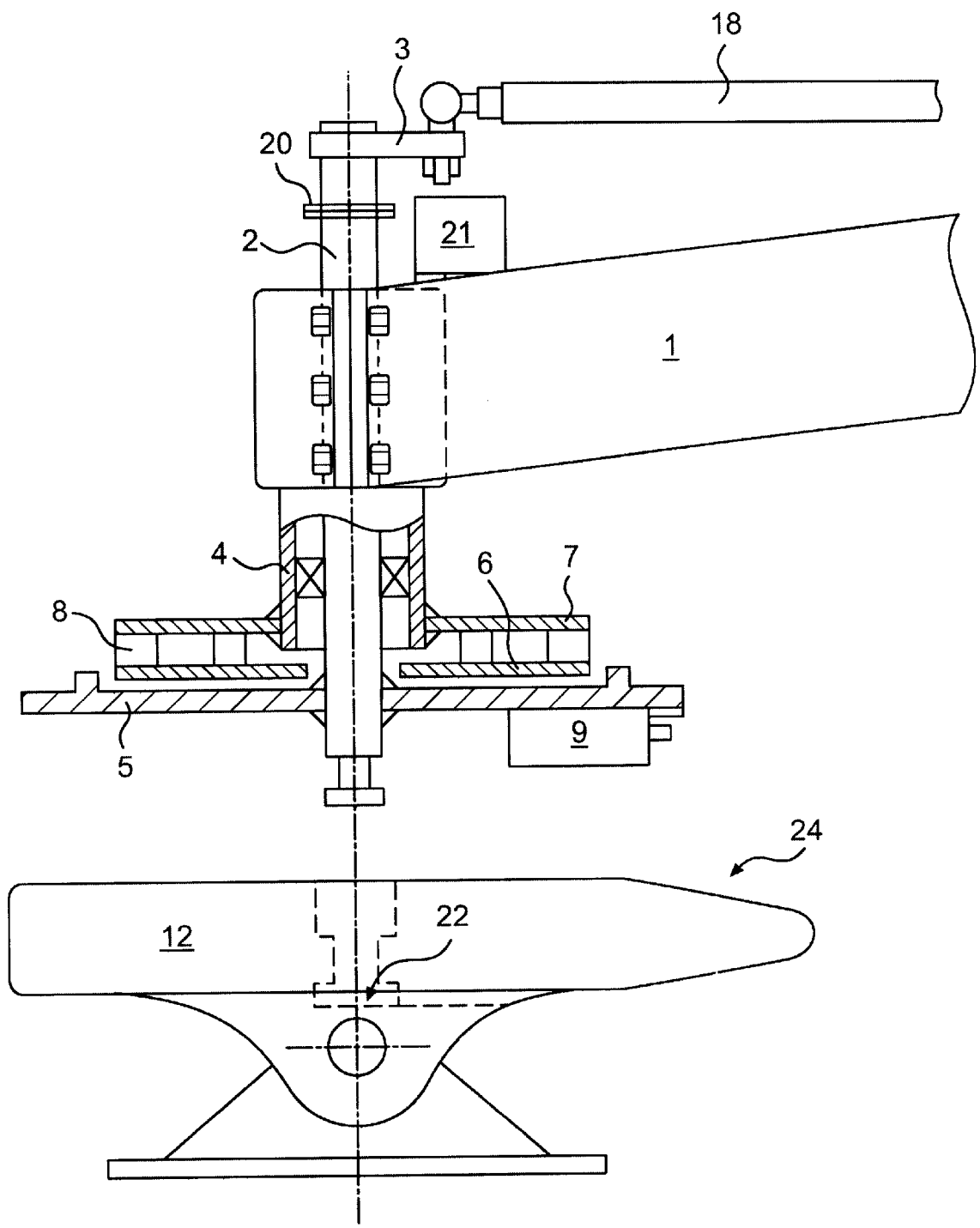
FIG. 1 is a side view of a coupling arrangement.

In FIG. 1 there is shown a coupling arrangement where a first coupling plate 12 is locating on the vehicle frame and second coupling plate 5 is locating in the end of the trailer frame, under the frame. A vertical pin 2 is fixed to the second coupling plate 5, the pin extending below the plate 5 and above the plate. The plate 5 and the pin 2 are rotatably mounted in relation to the trailer frame 1, fixed tube 4, and gliding flange 6,7,8.

Figure 4:
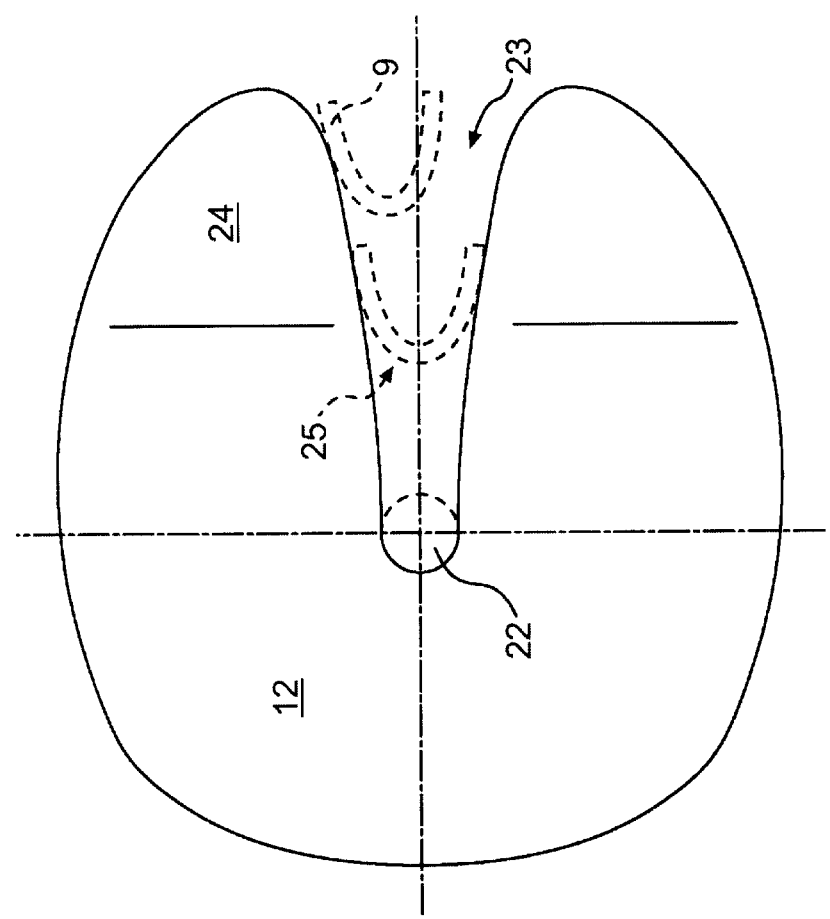
FIG. 4 is a top view of the coupling plate in the vehicle.
Figure 2:
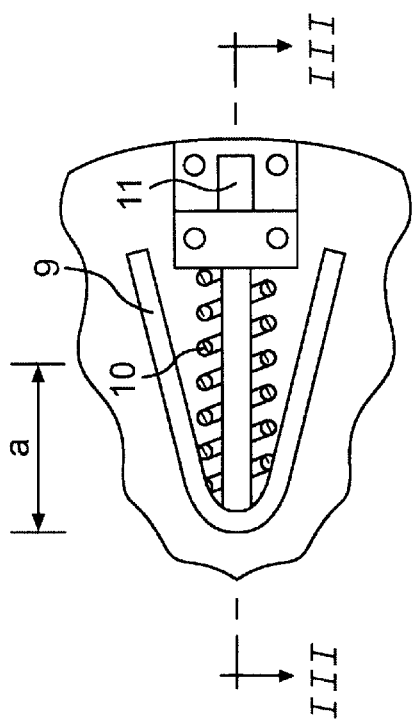
FIG. 2 shows a locking part seen from below.
Figure 3:
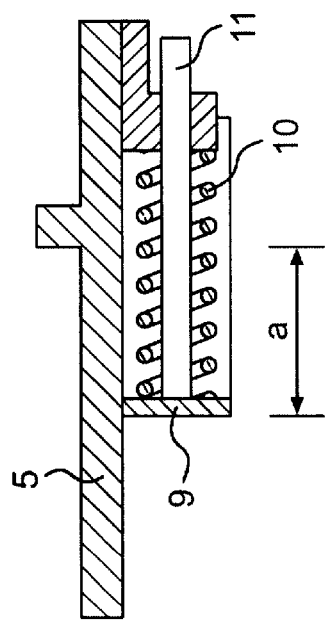
FIG. 3 is a side view of the locking part.

A movable locking part 9 locates under the plate 5, the part being able, according to FIGS. 2 and 3, to move horizontally towards and away from the pin 2. The part can move a distance "a" against the spring 10 as it is steered by a pin 11. The distance "a" can be elected to be so long that the part 9 can move away from the pin 2 so far that the first plate 12 can freely rotate in relation to second plate 5 when the pin 2 is locked in its seat 22 in the first plate 12. (this solution not shown) In this case the pulling vehicle can be driven into coupling from all possible directions.

so long that an accurate driving (aligning) direction is not needed for the pulling vehicle when driving it into the coupling, but it is needed that the part 9 meets somewhere in the groove 23. (FIG. 4) After locking of the pin 2 into the seat 22, driving a curved distance by the vehicle and trailer, will result in the spring 10 pushing the part 9 into its final place 25 in the groove 23.

Figure 5:
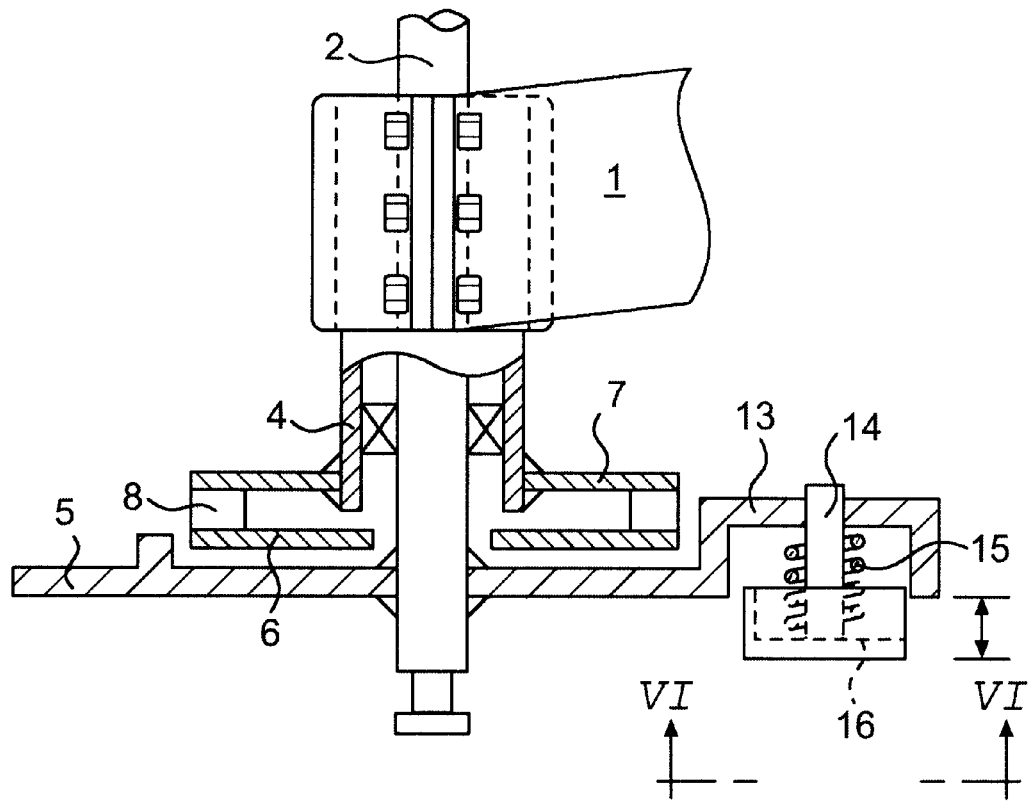
FIG. 5 is a side view of an alternative coupling arrangement.
Figure 6:
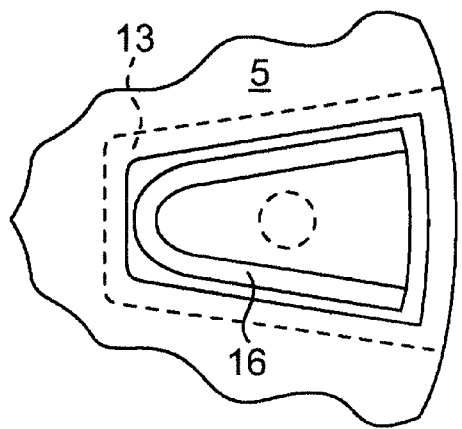
FIG. 6 shows a locking part seen from below.

In the FIGS. 5 and 6 there is shown an alternative locking part solution where a cavity 13 has been formed in the second coupling plate 5 for the locking part 16. The part 16 can move in the vertical direction against a spring 15 steered by a pin 14.

When driving the pulling vehicle into the coupling, the first coupling plate 12 by means of its inclined portion 24 lifts the locking part 16 up against the spring 15. This lifting occurs in all driving directions of the vehicle, except in the case wherein the locking part 16 locates in the line of the groove 23. In that case, the driving direction was just correct and the locking part 16 will move into its final place 25.

If the first coupling plate 12 has lifted the part 16 up so the locking part 16 has not fallen down into the groove 23, locking part 16 has to be secured by driving with the pulling vehicle along a short curved route so that the coupling plates 12 and 5 will have sufficient mutual rotation to effect that the locking part 16 can fall down into the groove 23.

Figure 7:
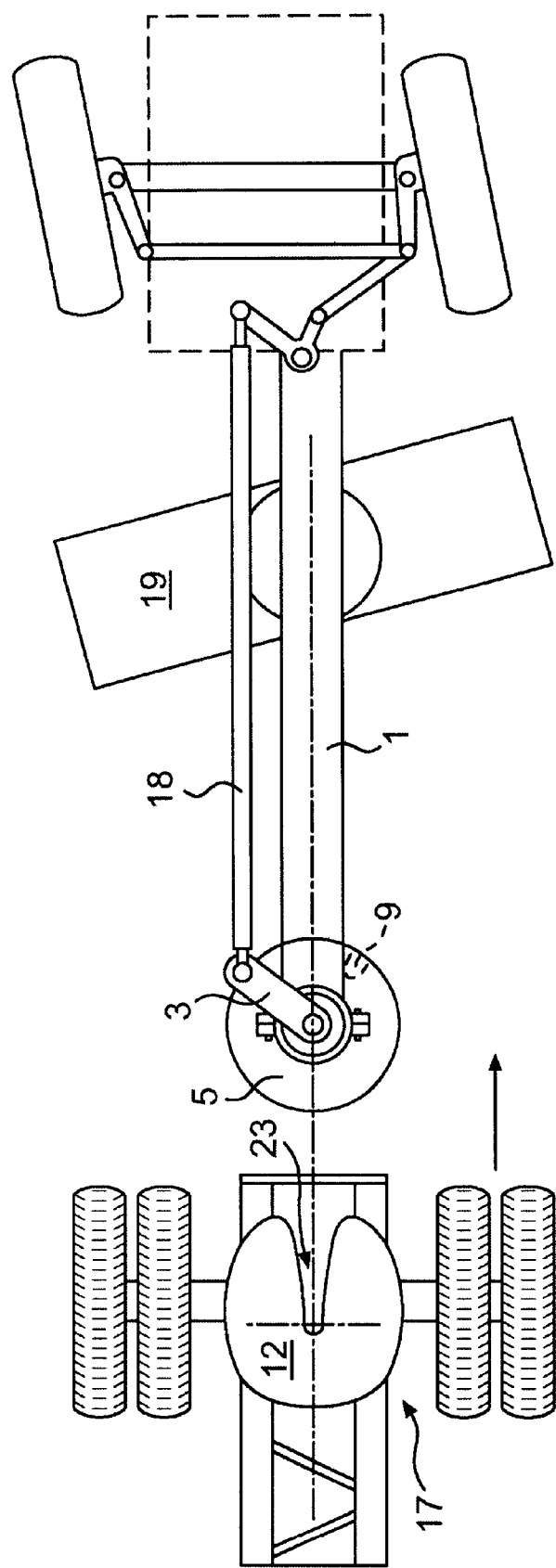
FIG. 7 is a top view of a drive into coupling.

FIG. 7 shows a pulling vehicle 17 and the first coupling plate 23 on the vehicle frame. A trailer comprises a frame 1, a work machine, as a brush device 19 fixed to the frame, and a coupling arrangement according to this invention mounted in the end of the frame 1. The coupling arrangement is the same as presented in the FIGS. 1–4. In the upper end of the pin 2, there is an arm 3 fixed to the pin and a steering mechanism 18 between the trailer wheels and the arm. The driving direction of the vehicle 17 is not correct where the locking part 9 will not meet the groove 23. If the present invention were not used, the locking part 9 would then have to be withdrawn or a new driving line would have to be elected.

In the FIG. 1 there is moreover presented an alternative system for steering the trailer wheels by means of information sensed from the coupling. On the frame 1 there is a control unit 21 for observing the turning angle of the pin 2. A sensor means 20 has been fixed round the pin 2. When the locking part 9 or 16 has been placed into its final place in the groove 23, the control unit 21 by means of sensor 20 begins to observe the angle of the vertical axle, as pin 2 in relation to the frame 1 line, for example. The observed angle information is real time sent to the unit near the trailer wheels (not shown), where there is, for example, a hydraulic system with a cylinder mounted thereon. The system is used for turning the wheels according to angle information received from the unit 21. The mechanism 18 is not needed in this case. The sensor 20 can be fixed also to the second coupling plate 5, wherein no vertical axle, as the pin 2 is needed above the plate 5, is needed only below the plate.

The locking part 9 or 16 can move into the groove 23 by means of horizontal or vertical motion or from whichever direction due to the used solution according to the invention.

I claim:

1. A coupling arrangement between a trailer having steering wheels and a pulling vehicle comprising:

a first coupling plate on the pulling vehicle, said first plate including an open groove;

a second coupling plate of said trailer which is placed on first coupling plate, said first and second plates having low friction surfaces allowing said second plate to rotate on said first plate, a vertical pin fixed to said second coupling plate which seats in a locking position in an end of said groove of said first plate while allowing rotation of said second plate relative to said first coupling plate a movable locking part fixed to said second plate;

a spring which moves said movable locking part into a locking position in the groove of said first coupling plate when said plates are rotating in relation to each other to lock said first and second plates against rotation, and a turning means for turning a driving direction of the steering wheels of said trailer, said turning means being associated with said second coupling plate and being arranged such that when the movable locking part is located in the locking position in said groove the driving direction of the wheels of said trailer match a driving direction of the pulling vehicle.

2. A coupling arrangement according to claim 1, wherein the locking part moves into the locking position in said groove in the horizontal direction.

3. A coupling arrangement according to claim 1, wherein the locking part moves into the locking position in said groove in the vertical direction.

4. A coupling arrangement according to claim 1, wherein the vertical locking pin is adapted to be received in said first coupling plate regardless of a location angle of said locking part to the groove of said first coupling plate.

5. A coupling arrangement according to claim 1, wherein the locking part is adapted to move into the groove from either rotational direction.

* * * * *